US 6,563,582 B1

(12) United States Patent
Chun (10) Patent No.: US 6,563,582 B1
(45) Date of Patent: May 13, 2003

(54) ACHROMATIC RETARDER ARRAY FOR POLARIZATION IMAGING

(76) Inventor: Cornell Seu Lun Chun, P.O. Box 2171, Inver Grove Heights, MN (US) 55076-8171

( * ) Notice: Subject to any disclaimer, the term of this patent is extended or adjusted under 35 U.S.C. 154(b) by 0 days.

(21) Appl. No.: 09/415,045

(22) Filed: Oct. 7, 1999

Related U.S. Application Data

(60) Provisional application No. 60/103,392, filed on Oct. 7, 1998.

(51) Int. Cl.[7] ............................... G01J 4/00; G02F 1/01
(52) U.S. Cl. ..................... 356/364; 356/369; 250/341.3; 250/332
(58) Field of Search ................................. 356/365–369; 250/431.3, 332, 208.1; 359/352, 497, 500, 501

(56) References Cited

U.S. PATENT DOCUMENTS

| | | | | |
|---|---|---|---|---|
| 3,897,136 A | * | 7/1975 | Bryngdahl | ................... 350/159 |
| 4,961,634 A | * | 10/1990 | Chipman et al. | ............ 350/403 |
| 5,473,465 A | * | 12/1995 | Ye | .............................. 359/246 |
| 5,479,015 A | * | 12/1995 | Rudman et al. | ............. 250/332 |
| 5,734,473 A | * | 3/1998 | Gerhart et al. | ............... 356/364 |
| 5,852,690 A | * | 12/1998 | Haggans et al. | ............... 385/37 |
| 6,122,103 A | * | 9/2000 | Perkins et al. | ............... 359/486 |
| 6,154,591 A | * | 11/2000 | Kershaw | ....................... 385/39 |
| 6,243,199 B1 | * | 6/2001 | Hansen et al. | ............... 359/486 |

* cited by examiner

*Primary Examiner*—Michael P. Stafira
*Assistant Examiner*—Layla Lauchman (57) ABSTRACT

In addition to having color, light waves have the attribute of polarization. An apparatus and method to convert circular polarized light into linearly polarized light over a wide range of wavelengths is provided by utilizing a first surface-relief grating functioning as a quarter-wave waveplate and a second surface-relief grating functioning as a half-wave waveplate. A plurality of such devices are arranged in a two-dimensional array and combined with an array of linear polarizers and an array of photodetectors to form a polarization imaging sensor. Such a sensor could have applications in automobiles to alert drivers of the presence of other vehicles, especially at night, in fog, or in rain. Military applications include the detection of vehicles placed among trees and shrubs. Another advantage of using circular polarization images is that the sign and magnitude of the circular polarization can potentially be used to reveal the spatial orientation, material, and surface roughness of the object's surface.

12 Claims, 8 Drawing Sheets

PRIOR ART

PRIOR ART

ACHROMATIC RETARDER ARRAY FOR POLARIZATION IMAGING

REFERENCE TO RELATED APPLICATION

This application claims the benefit of Provisional Patent Application Ser. No. 60/103,392 filed Oct. 7, 1998.

BACKGROUND—FIELD OF INVENTION

The invention relates to optical components particularly with respect to controlling the polarization of optical radiation.

BACKGROUND—DESCRIPTION OF THE PRIOR ART

In addition to having color, light waves have the attribute of polarization. Light is a superposition of two orthogonal states of polarization. We can consider one of these states to be an oscillation of the wave up and down along a vertical direction. The other state will be an oscillation left and right along a horizontal direction. If the two states are oscillating in phase, then, at a given point in space, the electric field vector of the light wave traces, in time, a segment along a straight line. The light is said to be linearly polarized. When the two states are oscillating partially out of phase, then the electric vector traces an ellipse. In particular, when they are out of phase by 90 degrees and the oscillation amplitudes are equal, then the electric vector traces a circle, and the light is circularly polarized. Light is circularly polarized, right-handed or left-handed, when the two states are out of phase by +90 or −90 degrees respectively. The properties of polarized light are described in detail in D. Clarke et al., *Polarized Light and Optical Measurement,* (Pergamon Press, Oxford, 1971).

Scientists understand that when linearly polarized light is incident on the surface of a material, the light which is reflected has a component which is circularly polarized. Such sources of linearly polarized radiation are pervasive in the visible and infrared wavelengths. Some examples are the polarization found in light from the daytime blue sky, in the thermal emission from the ocean surface, and in scattered light underwater. It is surprising then, that imaging sensors which are sensitive to circular polarization have not been developed for object detection and recognition. Recent measurements reported in K. P. Bishop et al., "Multi-spectral polarimeter imaging in the visible to near IR," in *Targets and Backgrounds: Characterization and Representation V,* W. R. Watkins, D. Clement, and W. R. Reynolds, Eds, Proceedings of SPIE Vol. 3699, 49–57(1999), suggest that, in the visible and near infrared wavelength range, as much as 5 percent of ambient light is circularly polarized. Another advantage of using circular polarization images is that the sign and magnitude of the circular polarization can potentially be used to reveal the spatial orientation, material, and surface roughness of the object's surface.

The generation by reflection of circularly polarized light is enhanced when the surface is smooth or the surface material is electrically conductive. These characteristics are more common in man-made surfaces than in natural surfaces. A sensor imaging circular polarization would be able to detect man-made objects in a background almost free of clutter. Such a sensor could have applications in automobiles to alert drivers of the presence of other vehicles, especially at night, in fog, or in rain. Military applications include the detection of vehicles placed among trees and shrubs.

In ambient scenes, there is potentially as much variety and information in polarization images as there is in color images. However, a practical and reliable method of imaging circular polarization has not been developed.

A method to detect circular polarization must distinguish between right-handed and left-handed polarized light. Most photodetectors are insensitive to polarization. So a filter must be placed in front of the detector which is able to transmit only right-handed or only left-handed polarized light. In practice, such a filter is a combination of a quarter-wave retarder and a linear polarizer.

As light travels through the retarder, the phase of the horizontal state of oscillation is shifted by 90 degrees relative to the vertical state of oscillation. Consider the case when right-handed circularly polarized light is incident on the retarder. The retarder tranforms the light into a linearly polarization state with oscillations along a direction rotated 45 degrees from horizontal.

The light then enters the linear polarizer. If the linear polarizer is oriented to transmit light oscillating along the direction rotated 45 degrees from horizontal, then the light will be incident on the photodetector. However, if the light originally had left-handed polarization, the light exiting the retarder would be linearly polarized along the direction rotated −45 degrees from horizontal and would not be transmitted by the linear polarizer. Hence, the combination of the quarter-wave retarder, linear polarizer, and photodetector will only respond to light containing right-handed circular polarization.

In contrast, if the linear polarizer is rotated so that it transmits light with oscillations along the direction rotated −45 degrees from horizontal, then the combination will respond only to left-handed circular polarized light. Similarly, the linear polarizer can remain fixed and the retarder rotated. At certain retarder orientations the combination will respond only to right-handed polarized light, and at certain other orientations only to left-handed polarized light. In a circular polarization sensor, the mechanism for rotating the linear polarizer or retarder introduces weight and cost and makes the sensor less reliable. In addition, the frequency at which the images can be updated, i.e. the frame rate, is limited by the rotation rate.

The simplest retarder is a plate, referred to, in the art, as a waveplate or phase plate, made of a birefringent material. Birefringent materials have a fast axis and a slow axis. Light waves, with oscillations along the direction of the fast axis, propagate with higher velocity than light waves, with oscillations along the slow axis. Because of this velocity difference, as light waves traverse a birefringent material, their two states of oscillations can be shifted in their relative phase. The phase shift as the light exits the waveplate is specified by choosing the thickness of the birefringent material.

Linear polarizers suitable for use in imaging sensors are know in the art. However, quarter-wave retarders with suitable characteristics have not been developed. The technology of retarders, are reviewed in J. M. Bennett et al., "Polarization," in *Handbook of Optics,* W. G. Driscoll, Editor (McGraw-Hill, New York, 1978).

For the purpose of imaging circular polarization of light in ambient scenes, a retarder should have the following characteristics.

First, retarders should have achromatic response. Ambient light contains a range of wavelengths. However, quarter-wave retarders in the art are able to transform light with a phase shift of 90 degrees in only a very narrow range of wavelengths. For use in imaging circular polarization, a quarter-wave retarder, is needed which is achromatic over a wavelength range matching the wavelength range of the photodetector.

An infrared retarder, which in the art is considered to be achromatic, is described in U.S. Pat. No. 4,961,634 to Chipman et al. (1990). However, measurements that show this device is only approximately achromatic are reported in Sornsin et al. "Alignment and calibration of an infrared achromatic retarder using FTIR Mueller matrix spectropolarimetry," in *Polarization: Measurement, Analysis, and Remote Sensing*, D. H. Goldstein et al., Eds, Proceedings of SPIE Vol. 3121, 28–34 (1997). These measurements show that over the wavelength range from 3 to 14 micrometers, the phase shift varies in a range from 74 to 98 degrees.

The device of Chipman et al. uses a combinations of two bulk crystals, cadmium sulfide (CdS) and cadmium selenide (CdSe). We use the term, bulk crystal, to refer to a macroscopic crystal as distinguished from a material formed as a thin film of microscopic thickness using methods related to the fabrication of integrated circuits.

An achromatic retarder which is a combination of two waveplates is described in M. G. Destriau et al., "Réalisation d'un quart d'onde quasi achromatique par juxaposition de deux lames cristallines de même nature," in *J. Phys. Radium* 10(2), 53–55 (1949). In order to convert circularly polarized light to linearly polarized light, light is first transmitted through a quarter-wave waveplate and then is transmitted through a half-wave waveplate. The two waveplates are made of the same birefringent material. However their fast axes are rotated relative to each other. By having a fixed angular displacement of the fast axes, the achromatic characteristics of the first waveplate is compensated by the second waveplate.

Destriau et al. explain the operation of their retarder by referring to Stokes parameters and the Poincaré sphere. Stokes parameters and the Poincaré sphere are described in detail in D. Clarke et al. A beam of incoherent radiation emitted or reflected from an object's surface can be completely described at a given wavelength by the four Stokes parameters, (I, Q, U, V). The first Stokes parameter I is a measure of the total intensity of radiation. The second parameter Q measures the amount of linear polarization in the horizontal direction. The third parameter U measures the amount of linear polarization at 45 degrees from the horizontal. The fourth parameter V is a measure of the circular polarization. In the art, the Stokes parameters are often normalized by dividing the parameters by I. Then Q, U, and V are restricted to values in the range −1 to 1.

Figure 1:
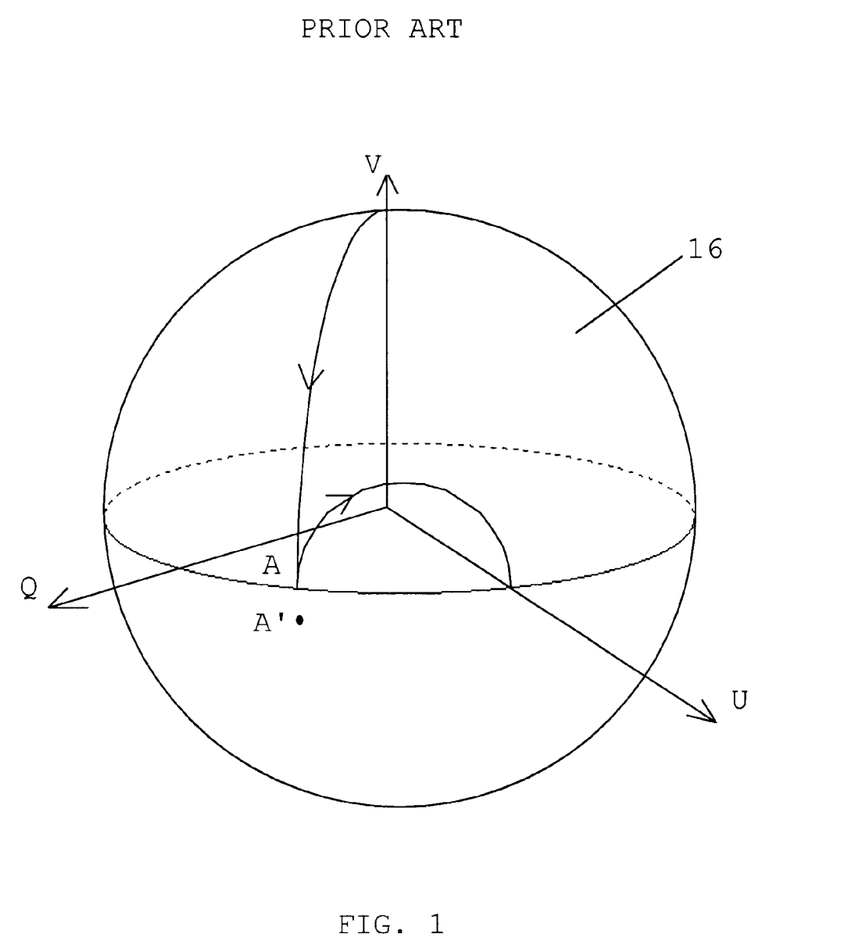
FIG. 1 is a diagram of the Poincare sphere with arrows indicating the operation of an achromatic retarder.

FIG. 1 shows a three-dimensional plot in an orthogonal coordinate system with axes Q, U, and V. In this coordinate system, the Poincaré sphere 16 is a spherical surface of unit radius centered at the origin. Every possible state of polarized light is represented by a point on the sphere. In particular, the north pole of the sphere represents right-handed circular polarization. Points on the equator of the sphere represent linear polarization along directions at various angles from horizontal. A quarter-wave waveplate maps a point on the sphere to a point defined by a 90 degree rotation about an axis through the origin. The axis and direction of rotation is determined by the orientation of the fast axis of the birefringent material of the waveplate.

Referring to FIG. 1, in the device of Destriau et al., the quarter-wave waveplate transforms the right-handed circularly polarized component V=1 to linearly polarized component A. Similarly a half-wave waveplate maps a point on the sphere to a point defined by a 180 degree rotation about an axis through the origin. The half-wave waveplate of Destriau et al. then rotates the direction of linear polarization to change component A to horizontally linear polarized component U=1.

The retarder made from the combination of a quarter-wave waveplate and half-wave waveplate is achromatic. For example, if, at a different wavelength, the difference between the fast and slow velocities in the birefringent material is slightly larger by a factor m>1, then, on the Poincare sphere 16, the component V will be transformed by the quarter-wave waveplate through a path m times longer to A'. In the half-wave waveplate, the path will also be m.times longer, so A' will be transformed to a point close to U=1.

Destriau et al. show measurements made with waveplates formed from mica, which is a bulk crystal. The method of Destriau et al. was used in P. Hariharan et al., "Variable achromatic polarization rotators," Opt. Eng. 36(9) 2563–2566 (1997). P. Hariharan et al. studied an achromatic polarization rotator using waveplates made of a bulk crystal, quartz.

In the above methods for producing achromatic retarders, the phase shift, or retardation, in each waveplate is determined by the thickness of the waveplate. During fabrication the thickness of a waveplate made from bulk crystal must be controlled to a fraction of a wavelength over the optical aperture, which is difficult. This difficulty increases the cost of fabrication.

This leads to a second desirable characteristic for retarders to be used for imaging circular polarization: thin planar structure fabricated using microfabrication methods. These microfabrication methods have been developed for the manufacturing of integrated circuits and micro-electromechanical systems (MEMS) and are routinely used to produce thin planar structures with features having dimensions of a fraction of a wavelength.

A thin planar structure which has been studied for use as a waveplate is a surface-relief grating. A surface-relief grating is a series of identical parallel linear ridges arranged on a planar substrate. Waveplates formed from surface-relief gratings are described in C. W. Haggans et al., "Polarization transformation properties of high spatial frequency surface-relief gratings and their applications," in *Micro-optics: Elements, systems and applications*, H. P. Herzig, Editor (Taylor & Francis, London, 1997). They offer the following advantages over waveplates made of bulk crystals.

Bulk crystals are processed one crystal at a time. Thin planar structures can be fabricated in a batch process to reduce cost. For example, several waveplates may be fabricated simultaneously on a single substrate and several substrates can be processed simultaneously.

Optical devices with larger aperture require larger size bulk crystals. Larger size bulk crystals are more difficult and more costly to fabricate. Using microfabrication methods, waveplates can be made as a continuous thin planar structure over a large area substrate in order to provide a large optical aperture at much lower cost.

Thin planar structures are lightweight compared to bulk crystals. Lightweight is important for an imaging sensor to be portable. Lighter weight also leads to lower cost for the mechanical structure supporting the optical elements.

A waveplates made of a birefringent bulk crystal often has a fast axis that has spatial variation due to nonuniformity in the growth of the crystals. This causes a variation of the phase shift over the aperture. Surface-relief gratings have their fast axes determined, not by the material, but instead by the structure of fabricated ridges. Using microfabrication methods the structures have very high uniformity and the spatial variation of the fast axes is negligible. Retarders made with surface-relief gratings will have negligible variation in phase shift over the aperture.

The handling of bulk crystals restricts the sizes of waveplates to macroscopic dimensions. However, retarders made as thin planar structures can be microscopic in size. Microscopic retarders can be used in optical fiber systems and optical signal processing systems. Microscopic retarders can also be fabricated on a substrate in one- and two-dimensional arrays. Two-dimensional arrays of retarders are of interest for use with two-dimensional photodetector arrays, called focal plane arrays, in imaging sensor systems.

A third desirable characteristic for retarders considered for use in imaging systems is a large field angle, also called acceptance angle. The angle of incidence is the angle between a light ray and the main optical direction of the retarder. For a light ray, along the main optical direction in a quarter-wave retarder, the phase shift is 90 degrees. As the light ray deviates from the main optical direction, the angle of incidence becomes larger, and the phase shift deviates from 90 degrees. The maximum tolerable deviation of phase shift defines the maximum angle of incidence for the retarder. The field angle of the retarder is twice the maximum angle of incidence.

A large maximum field angle is advantageous in an imaging system. In general, the sensitivity of a sensor increases as the aperture of the optical system is increased, because more light enters the sensor. The f-number decreases, and light is incident on the retarder in a wider range of angles, so a larger field angle is required.

Both retarders made of bulk crystals and waveplates made from a single surface-relief grating have maximum field angles too small for practical use in a sensor to image circular polarization.

A fourth desirable characteristic for retarders considered for use in imaging systems is insensitivity to temperature variations. The phase shift introduced by a retarder should not vary with its temperature. This insensitivity in important in portable systems or sensors for use in extreme temperatures such as in cryogenic environments, in hot engines, or in aircraft, missiles, and spacecraft.

The phase shift is determined by the thickness of a waveplate and the velocities of light waves with oscillations along the fast and slow axes. The thickness will change with temperature as characterized by the coefficient of thermal expansion of the waveplate material. The two velocities will also vary with temperature, since the indexes of refraction of materials vary with temperature. Retarders made of bulk crystals and waveplates made from a single surface-relief grating have phase shifts which are temperature dependent.

A fifth desirable characteristic for retarders considered for use in imaging systems is insensitivity to process biases. A process bias is an unintentional change in a dimension which uniformly affects all fabricated devices. For example, if a batch of waveplates were made with a thickness slightly too large, retarders made using a combination of these waveplates should be insensitive to the thickness change and provide a phase shift sufficiently close to the intended value.

SUMMARY OF THE INVENTION

An apparatus and method to convert circular polarized light into linearly polarized light over a wide range of wavelengths is provided by utilizing a first surface-relief grating functioning as a quarter-wave waveplate and a second surface-relief grating functioning as a half-wave waveplate. A plurality of such devices are arranged in a two-dimensional array and combined with an array of linear polarizers and an array of photodetectors to form a polarization imaging sensor.

OBJECTS AND ADVANTAGES

Accordingly several objects and advantages of our invention are as follows.

Object 1. The present invention provides an optical retarder which is achromatic and has thin planar structure.

Object 2. The present invention provides an optical retarder which has a larger field angle than bulk crystal retarders and waveplates made with a single surface-relief grating. Larger field angle is a new and unexpected advantage, not appreciated in the prior art.

Object 3. The present invention provides an optical retarder which is insensitive to variations in temperature. Insensitivity to temperature is a new and unexpected advantage, not appreciated in the prior art.

Object 4. The present invention provides an optical retarder which is insensitive to process biases. Insensitivity to process biases is a new and unexpected advantage, not appreciated in the prior art.

Object 4. The present invention provides an optical retarder which can be fabricated using micromachining and micro-electromechanical processing methods.

Object 5. The present invention provides an optical retarder which can be fabricated in a batch process as several devices on a substrate or as several substrates processed simultaneously.

Object 6. The present invention provides a optical retarder which can be formed as continuous structure over a large area substrate in order to provide a large optical aperture.

Object 7. The present invention provides an optical retarder with negligible variation in phase shift over the aperture.

Object 8. The present invention provides an achromatic optical retarder which can be fabricated in microscopic dimensions for use with other microscale optical devices such as in optical fiber systems, in optical signal processing systems, and in imaging systems using focal plane arrays. The ability to fabricate the achromatic retarder in microscale dimensions is a new and unexpected advantage, not appreciated in the prior art.

Object 9. The present invention provides an achromatic optical retarder which can be fabricated on a substrate in one- and two-dimensional arrays. Two-dimensional arrays of retarders are of interest for use with two-dimensional photodetector arrays, called focal plane arrays, in imaging sensor systems. The ability to fabricate the achromatic polarizer in one- and two-dimensional arrays is a new and unexpected advantage, not appreciated in the prior art.

Object 10. The present invention provides an achromatic circular-to-linear polarizer which can be fabricated on a substrate in a two-dimensional array and combined with an array of linear polarizers and an array of photodetectors to form a polarization imaging sensor. The ability to form an sensor to image circular polarization is a new and unexpected advantage, not appreciated in the prior art.

Object 11. The present invention provides a sensor to image circular polarization without the mechanical rotation of a linear polarizer or a waveplate. The ability to form a sensor to image circular polarization without mechanical rotation is a new and unexpected advantage, not appreciated in the prior art.

Object 12. The present invention provides an achromatic optical retarder which can be fabricated on a substrate in a two-dimensional array and combined with an array of linear polarizers on the same substrate, where the substrate will maintain the alignment of each retarder relative to its corresponding linear polarizer.

Further objects and advantages of the invention will become apparent from a consideration of the drawings and ensuing description.

DETAILED DESCRIPTION—PREFERRED EMBODIMENT

Figure 2:
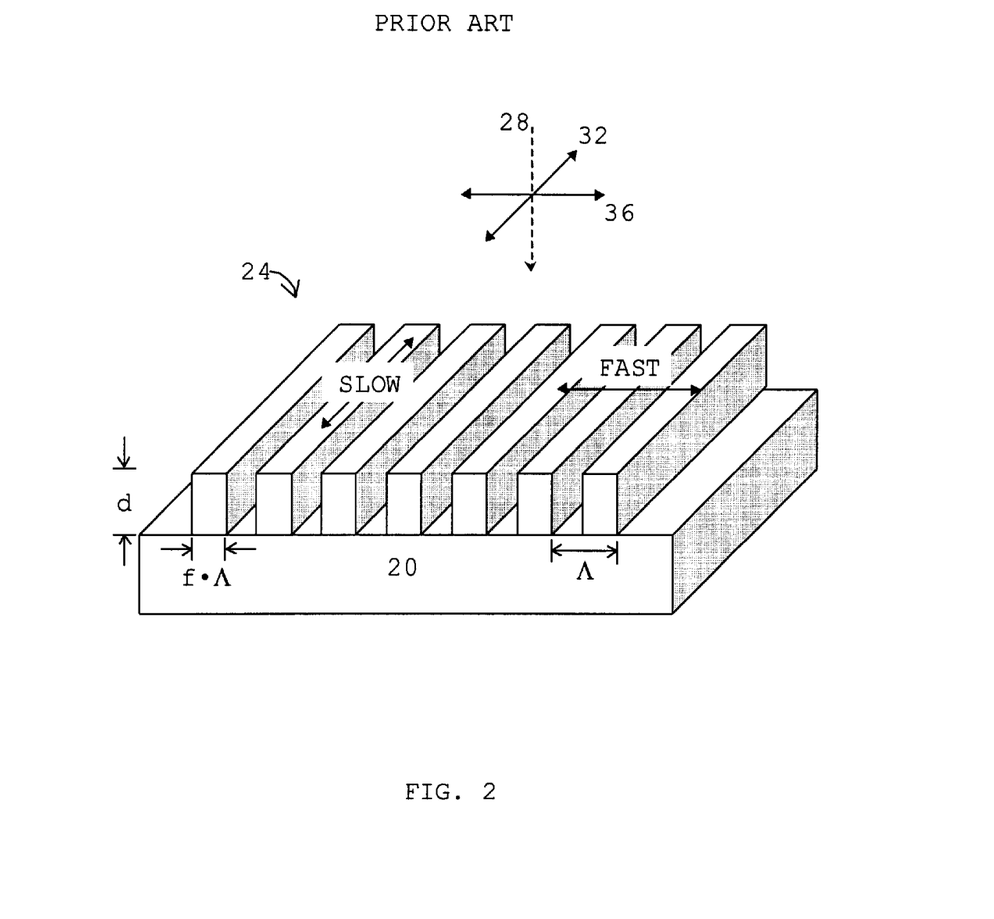
FIG. 2 is a perspective view of a surface-relief grating which is birefringent and is used as a waveplate.

FIG. 2. Shows a typical surface-relief grating which can be used as a waveplate. A substrate 20 is a material which is transparent to light and has index of refraction n. Substrate 20 has a planar surface on which a surface-relief grating 24 is formed. Surface-relief grating 24 is a series of linear ridges, of rectangular profile, arranged parallel to each other and equally spaced. The period of the ridges is $\Lambda$. The width of a ridge is $f \cdot \Lambda$. The height, or thickness, of the ridges is d.

The behavior of grating 24 as a waveplate can be described as follows. Light 28 is traveling in a direction normal to the planar surface and is incident on grating 24. If the wavelength of light 28 is greater than $\Lambda \cdot n$, then the light will not be diffracted by grating 24, and grating 24 is a birefringent material. The electric vector of light 28 has two states of oscillation, a state of oscillations along a direction 32 parallel to the linear ridges and a state of oscillations along a direction 36 perpendicular to the linear ridges.

When light 28 enters grating 24, the state of oscillation along direction 32 will propagate with a slow velocity, and the state of oscillation along direction 36 will propagate with a fast velocity. Direction 36 is along the fast axis of grating 24. As light 28 travels through grating 24, the relative phase between the oscillation along direction 32 and oscillation along direction 36 will vary. As light 28 exits grating 24, there will be a phase shift between the state of oscillations along a direction 32 and the state of oscillations along a direction 36 which depends on thickness d.

If the phase shift is 90 degrees, then grating 24 acts as a quarter-wave waveplate. If the phase shift is 180 degrees, then grating 24 acts as a half-wave waveplate.

If the surface-relief grating 24 is to be used with light in the wavelength range from 3 to 5 micrometers, then a suitable substrate material would be silicon with index of refraction n approximately equal to 3.4. We can have the period $\Lambda$ of the ridges be 0.8 micrometer, and the duty cycle f be 0.5. We then can calculate an approximate value for thickness d such that the phase shift is 90 degrees, i.e. the grating acts as quarter-wave waveplate, using the effective medium theory described in A. Yariv et al., "Electromagnetic propagation in periodic stratified media. II. Birefringence, phase matching, and x-ray lasers," *J. Opt. Soc. Am.* 67(4) 438–448 (1977). For light of wavelength 3 micrometers the thickness d is 0.63 micrometer. If the thickness d is doubled to 1.26 micrometer, the grating will act as a half-wave waveplate.

Effective medium theory is an approximation for describing the behavior of light passing through a surface-relief grating, since effective medium theory does not consider reflections at interfaces. In order to calculate the exact phase shift, i.e. retardance, and the intensity of light transmitted through the waveplate, one should use rigorous coupled-wave theory. Rigorous coupled-wave theory is described in M. G. Moharam et al., "Formulation for stable and efficient implementation of the rigorous coupled-wave analysis of binary gratings," *J. Opt. Soc. Am.* A 12(5) 1068–1076 (1995).

Figure 3:
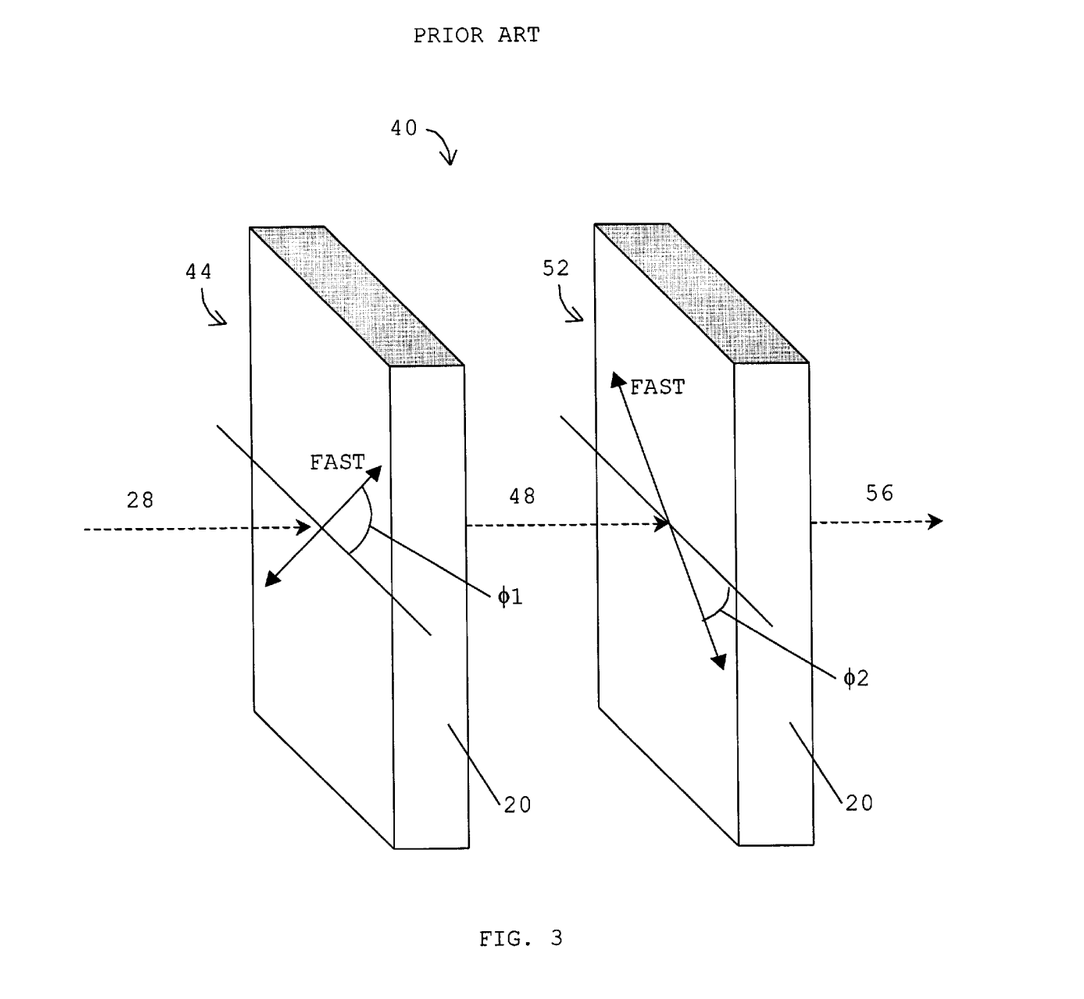
FIG. 3 is a perspective view of an achromatic retarder comprising two surface-relief gratings.

FIG. 3 shows an achromatic retarder 40 operating using the principle described in Destriau et al. Light 28 is incident, in a normal direction, on a quarter-wave waveplate 44, made from a first surface-relief grating. Waveplate 44 has its fast axis at angle $\phi 1$ from horizontal. Light 48 which exits waveplate 44 is incident, in a normal direction, on a half-wave waveplate 52, made from a second surface-relief grating. Waveplate 52 has its fast axis at angle $\phi 2$ from horizontal. Angles $\phi 1$ and $\phi 2$ are defined as positive when the rotation is clockwise as viewed in the direction of travel of light 48.

If retarder 40 is to be used in the wavelength range from 3 to 5 micrometers, then the above dimensions for a surface-relief grating on a silicon substrate can be used. Using the values $\phi 1=-30.0$ degrees and $\phi 2=29.3$ degrees, the phase shift, or retardance, can be calculated using effective medium theory and is shown as data points marked with x's in FIG. 4A. The retardance is close to 90 degrees and is nearly independent of wavelength with a standard deviation of 0.626 degree. This calculation demonstrates that, in FIG. 3, if light 28 incident on retarder 40 is right circularly polarized, then light 56, exiting retarder 40, is nearly completely linearly polarized for all wavelengths in the range 3 to 5 micrometers, that is retarder 40 is achromatic. Light 56 is nearly completely linearly polarized with electric vector oscillating along a direction 45 degrees from horizontal, which is the same as the point on the Poincare sphere at U=1 in FIG. 1.

For comparison, we show that a quarter-wave waveplate made from a single surface-relief grating is not achromatic. Its retardance is plotted as squares in FIG. 4A and has a standard deviation of 12.5°.

The retarder 40 also has a wider field angle than a single waveplate. If a ray of light 28 enters the quarter-wave waveplate 44 in a direction normal to the surface, then, in FIG. 1, V will be transformed to A. If another ray enters waveplate 44 at an angle not normal to the surface, then it travels a longer distance through waveplate 44, and V will be transformed to A'. The latter ray will also travel through a longer distance in the half-wave waveplate 52, and A' will be transformed to a point close to U=1. Hence, retarder 40 maintains a phase shift close to 90 degrees as the field angle increases from zero.

Figure 4A:
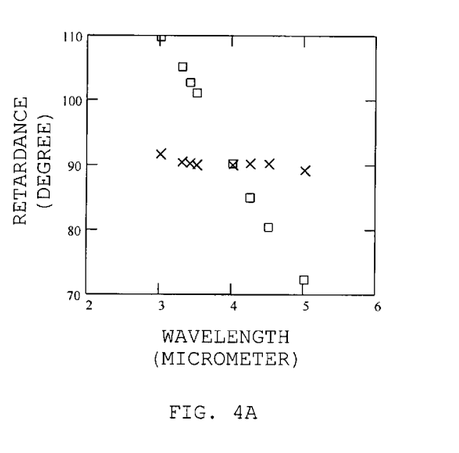
FIG. 4A and FIG. 4B are graphs showing the calculated retardance values for an achromatic retarder of the type shown in FIG. 3.
Figure 4B:
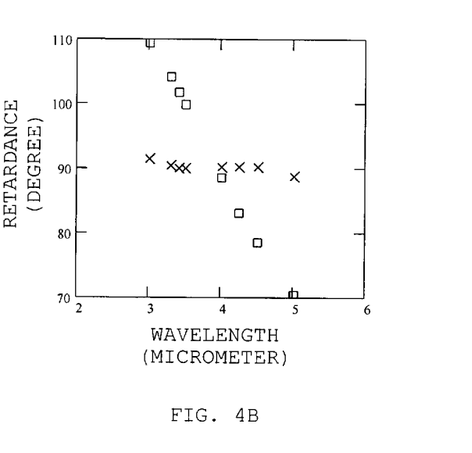

The retardance for retarder 40 at the field angle of 22.6 degrees, i.e. an angle of incidence of 11.3 degrees, corresponding to optical f-number equal to 1.2, is shown marked as x's in FIG. 4B and is nearly identical to the retardance for normal incidence shown in FIG. 4A.

For comparison, the quarter-wave waveplate made from a single surface-relief grating does not have as wide a field angle. Its retardance, for angle of incidence of 11.3 degrees, is plotted as squares in FIG. 4B and is 1 to 3 degrees less than the retardance for normal incidence shown in FIG. 4A.

Retarder 40 is insensitive to variations in temperature. At an initial temperature, if light 28 enters the quarter-wave waveplate 44, then, in FIG. 1, V will be transformed to A. If the temperature increases the thickness of waveplate 44 will increase as characterized by the coefficient of thermal expansion of the material of waveplate 44. Because the thickness has increased, if light 28 enters waveplate 44, then the light travels a longer distance through waveplate 44, and V will be transformed to A'. The temperature increase also causes a thickness increase in half-wave waveplate 52. Light 48 will travel through a longer distance In the half-wave waveplate 52, and A' will be transformed to a point close to U=1. Hence, retarder 40 maintains a phase shift close to 90 degrees as temperature varies.

Retarder 40 is also insensitive to the effects of variations in temperature on the velocities of light waves with oscillations along the fast and slow axes. The two velocities will vary with temperature, since the indexes of refraction of materials vary with temperature. At an initial temperature, if light 28 enters the quarter-wave waveplate 44, then, in FIG. 1, V will be transformed to A. If the temperature increases, the fast and slow velocities change, and the phase shift introduced by waveplate 44 changes by a factor m. Because the phase shift introduced by waveplate 44 has changed, V will be transformed by factor m further to A'. The temperature increase also causes a change in phase shift by factor m in half-wave waveplate 52. A' will be transformed by factor m further to a point close to U=1. Hence, retarder 40 maintains a phase shift close to 90 degrees as temperature variation cause changes in the velocities of light in the waveplates.

Retarder 40 is insensitive to process biases. A process bias is an unintentional change in a dimension which uniformly affects all fabricated devices. Suppose that waveplate 44 is initially manufactured with the correct thickness. If light 28 enters the quarter-wave waveplate 44, then, in FIG. 1, V will be transformed to A. If later the manufacturing process is altered such that thickness of waveplate 44 is increased by a factor m>1, then light 28, entering waveplate 44, travels a longer distance through waveplate 44, and V will be transformed to A'. Half-wave waveplate 52 will also have a thickness increase by factor in. Light 48 will travel through a longer distance in the half-wave waveplate 52, and A' will be transformed to a point close to U=1. Hence, retarder 40 maintains a phase shift close to 90 degrees for a process bias such as a uniform change in waveplate thicknesses.

Figure 5A:
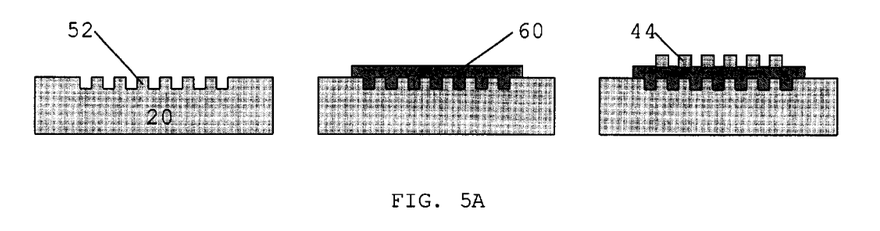
FIG. 5A and FIG. 5B show in cross sectional side view process methods for fabricating an achromatic retarder of the type shown in FIG. 3.

Retarder 40 can be fabricated as a thin planar structure on a substrate using conventional microfabrication methods. These microfabrication methods have been developed for the manufacturing of integrated circuits and microelectromechanical systems (MEMS). There are two possible process methods. FIG. 5A shows the first process method. Substrate 20, which has a high index of refraction n, is etched to form half-wave waveplate 52. Then a planarizing layer 60 of low index of refraction is deposited. Quarter-wave waveplate 44, made of material with high index of refraction, is deposited and patterned on top of planarization layer 60.

Figure 5B:
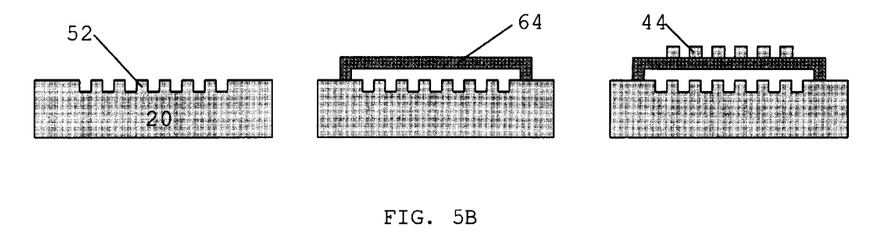

FIG. 5B shows a second process method. Again substrate 20, which has a high index of refraction n, is etched to form half-wave waveplate 52. A microbridge 64 is formed over the waveplate 52, and quarter-wave waveplate 44 is deposited and patterned on the microbridge. Large two-dimensional arrays of microbridges are common in the semiconductor industry. Microbridges are used extensively as part of microbolometer arrays in uncooled focal plane arrays in thermal imaging cameras.

Retarder 40 can be fabricated on a substrate and replicated in one- and two-dimensional arrays. Two-dimensional arrays of retarders are of interest for use in imaging sensor systems. Imaging sensors generally have an objective lens which focuses light from objects onto a focal plane. A focal plane array is a two-dimensional array of photodetectors, located at the focal plane of the lens. Each photodetector receives light from a respective object point in the field-of-view. With this method an image of the first Stokes parameter I, or intensity, can be captured. Consider instead a method for capturing images of all four Stokes parameters, I, Q, U, and V.

Figure 6:
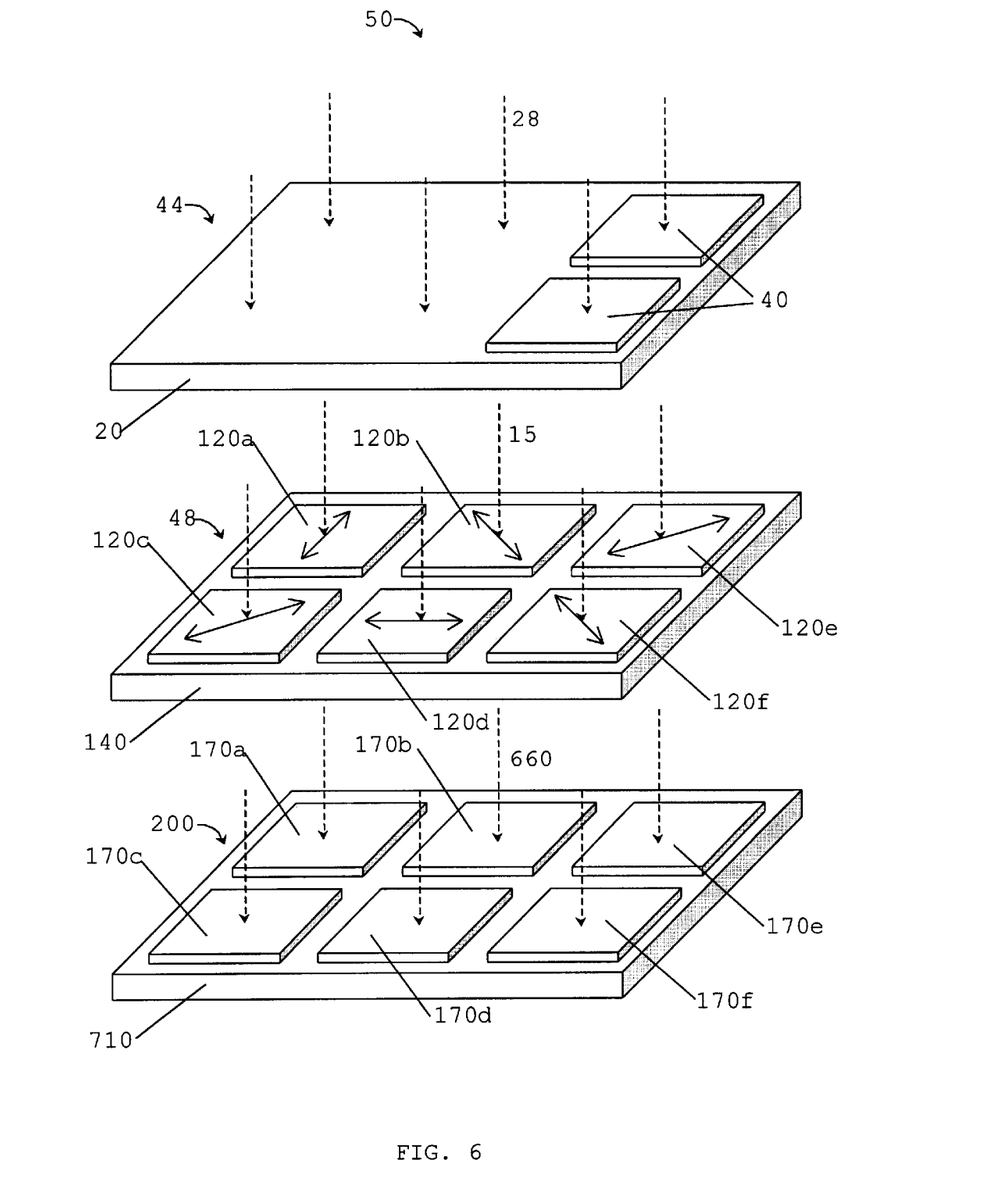
FIG. 6 is a schematic view of a group of six neighboring pixels arranged to have achromatic retarder elements of the type shown in FIG. 3 and linear polarizer elements with rotated orientations.
Figure 7:
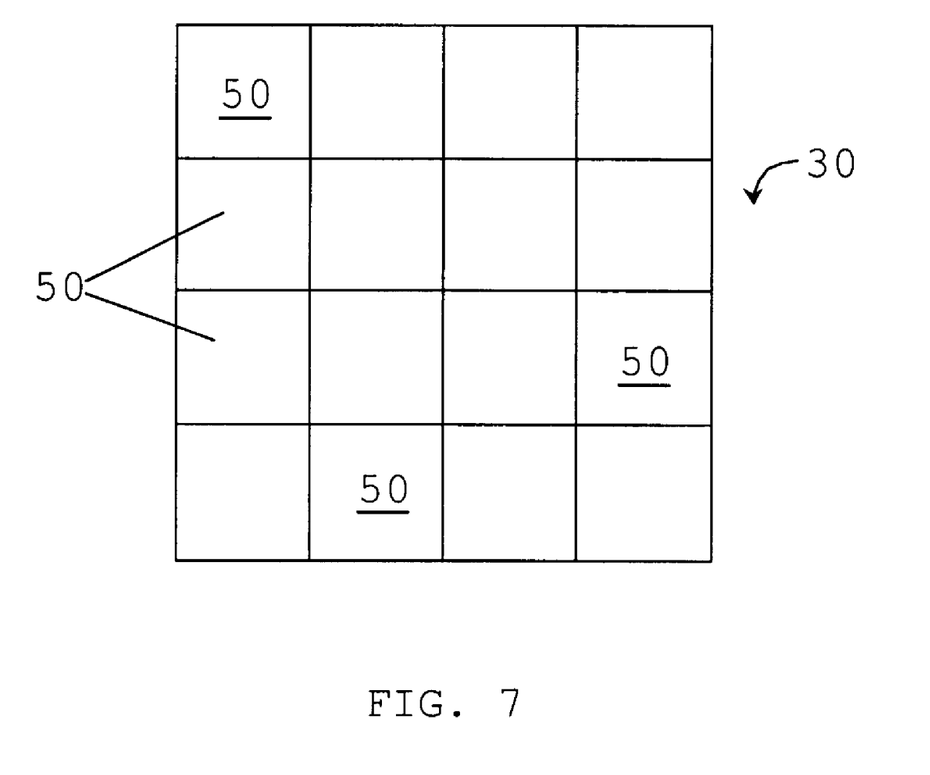
FIG. 7 shows in block format an ensemble of receiver assemblies of the type shown in FIG. 6 arranged to form an array.

FIG. 7 shows an ensemble 30 of receiver assemblies 50 which is located in the focal plane of a lens. Each receiver assembly 50 received light from a respective object point in the field-of-view. FIG. 6 shows a receiver assembly 50. The receiver assembly 50 is a combination of a achromatic retarder subarray 44, a linear polarizer subarray 48, and a photodetector subarray 200. The photodetector subarray 200 includes optical sensors 170a, 170b, 170c, 170d, 170d, 170e, and 170f and the electronic circuitry necessary for biasing and amplifying the electronic signals in response to irradiation of the photodetectors.

Again referring to FIG. 6, the linear polarizer subarray 48 includes linear polarizer 120a, 120b, 120c, 120d, 120e, and 120f. The retarder subarray 44 includes achromatic retarders 40. Retarder subarray 44, linear polarizer subarray 48, and photodetector subarray 200 are placed relative to each other such that all light 28 entering optical sensor 170e is first intercepted by retarder 40 followed by linear polarizer 120e, all light 28 entering optical sensor 170f is first intercepted by retarder 40 followed by linear polarizer 120f, all light 28 entering optical sensor 170a is first intercepted by linear polarizer 120a, all light 28 entering optical sensor 170b is first intercepted by linear polarizer 120b, all light 28 entering optical sensor 170c is first intercepted by linear polarizer 120c, and all light 28 entering optical sensor 170d is first intercepted by linear polarizer 120d.

Linear polarizer 120a transmits light polarized in the direction 90 degrees from horizontal as indicated by the double-headed arrows in FIG. 6. Similarly, polarizer 120b transmits −45 degrees, polarizer 120c transmits 45 degrees, polarizer 120d transmits 0 degrees, polarizer 120e transmits 45 degrees, and polarizer 120f transmits −45 degrees. If optical sensors 170a, 170b, 170c, 170d, 170e, and 170f view a localized area on an object then the Stokes parameters of the radiation from that object point can be determined using the relation $I=i(0,0)+i(90,0)$ $Q=i(0,0)-i(90,0)$ $U=i(45,0)-i(-45,0)$ $V=i(45,90)-i(-45,90)$ where i(x,y) is the intensity of light received at an optical sensor after light 28 first passes through a retarder with phase shift of y degrees and then through a linear polarizer oriented to transmit at x degrees from horizontal. In particular optical sensors 170a, 170b, 170c, 170d, 170e, and 170f measure the intensities i(90°,0°), i(−45°,0°), i(45°,0°), i(0°,0°), i(45°,90°), and i(−45°,90°) respectively.

Linear polarizer arrays, their fabrication, and use in polarization imaging systems were disclosed by the present inventor in U.S. Pat. No. 5,416,324 (1995). In the inventor's patent, each element of the linear polarizer array is a wire grid polarizer. The linear polarizer array is fabricated using microfabrication processes.

DESCRIPTION AND OPERATION OF ALTERNATIVE EMBODIMENTS

Although the present invention has been described above in its preferred embodiment, alternative embodiments are possible which use the method describe above.

(a) Achromatic retarder 40 of FIG. 3 can also be used for achromatic conversion of linearly polarized light into circularly polarized light by transmitting a beam of light in the opposite direction.

(b) The profile of the surface-relief gratings used in achromatic retarder 40 can be altered to tailor properties such as the wavelength response, transmission, and phase shift of retarder 40. Ways the profile can be altered include using non-rectangular profile and varying the thicknesses d, periodicity Λ, and duty cycles f.

(c) In the proximity of quarter-wave retarder 44 and half-wave retarder 52 in FIG. 3, non-polarizing optical filters can be located. Such optical filters include anti-reflective films and coatings, neutral density filters, and wavelength-selective filters.

(d) If imaging of only Stokes parameters I and V is desired, receiver assembly 50 shown in FIG. 6 can be simplified by eliminating optical sensors 170a, 170b, 170c, and 170d and their associated linear polarizers, then I=i(45°, 90°)+i(−45°,90°) and V=i(45°, 90°)−i(−45°,90°).

(e) In receiver assembly 50 shown in FIG. 6, each achromatic retarder 40 can be rotated about the direction of light 28, provided its corresponding linear polarizer is also rotated to maintain the original relative orientation between retarder and linear polarizer.

Figure 8:
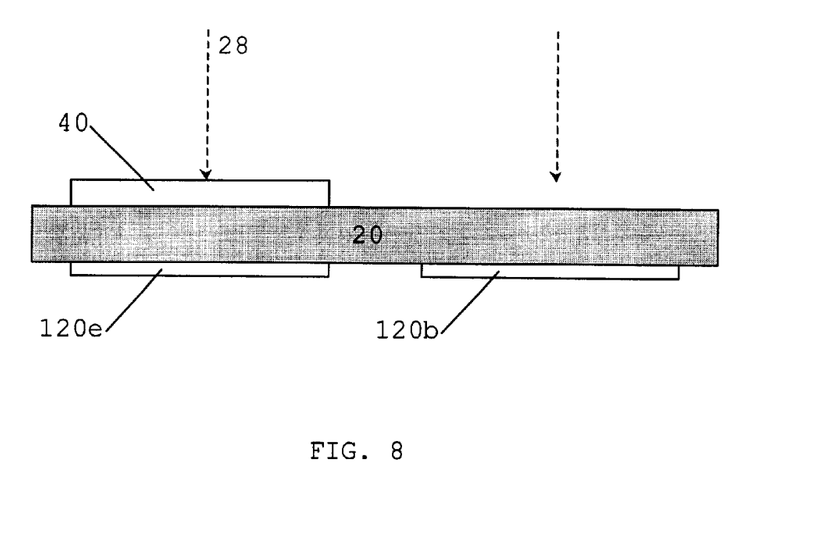
FIG. 8 show in cross sectional side view an embodiment where achromatic retarders and linear polarizers are supported by the same substrate.

(f) In receiver assembly 50, achromatic retarder subarray 44 and linear polarizer subarray 48 can be fabricated on the same substrate 20 as shown in FIG. 8. Fabrication on the same substrate has the advantage that substrate 20 will maintain the alignment of each retarder relative to its corresponding linear polarizer.

CONCLUSION, RAMIFICATONS, AND SCOPE

Although the embodiments described referred to the processing and sensing of light, the present invention is applicable to the processing and sensing of other forms of electromagnetic radiation, such as microwave, millimeter wave, and x-rays.

While the invention has been described in its preferred embodiments, it is understood that the words which have been used are words of limitations and that changes within the purview of the appended claims may be made without departing from the scope and spirit of the invention in its broader aspects.

What is claimed is:

1. Apparatus for obtaining data concerning the characteristics of objects within a field of view comprising:

(a) means for directing electromagnetic waves from object points onto a plurality of assemblies wherein each said assembly responds only to said waves originating from a respective object point with each said assembly including:

(b) a first quarter-wave retarder of thin planar structure, a first half-wave retarder of thin planar structure, a first linear polarizer, wherein said first quarter-wave retarder, said first half-wave retarder, and said first linear polarizer are oriented to transmit only the right-hand circularly polarized component of said electromagnetic waves over a range of wavelength values of said electromagnetic waves, (c) a first means to detect said waves transmitted through said first quarter-wave retarder, said first half-wave retarder, and said first linear polarizer, (d) a second quarter-wave retarder of thin planar structure, a second half-wave retarder of thin planar structure, a second linear polarizer, wherein said second quarter-wave retarder, said second half-wave retarder, and said second linear polarizer are oriented to transmit only the left-hand circularly polarized component of said electromagnetic waves over a range of wavelength values of said electromagnetic waves, (e) a second means to detect said waves transmitted through said second quarter-wave retarder, said second half-wave retarder, and said second linear polarizer, (f) means for combining signals from said first detection means and said second detection means to yield output signals corresponding to at least one of first Stokes parameter I and fourth Stokes parameter V.

2. The apparatus of claim 1 wherein said first quarter-wave retarder comprises a first surface-relief grating, said first half-wave retarder comprises a second surface-relief grating, said second quarter-wave retarder comprises a third surface-relief grating, and said second half-wave retarder comprises a fourth surface-relief grating.

3. The apparatus of claim 2 wherein said first linear polarizer and said second linear polarizer are wire grid polarizers.

4. The apparatus of claim 3 wherein said electromagnetic waves includes wavelength values in the infrared range.

5. The apparatus of claim 1 wherein said first linear polarizer and said second linear polarizer are wire grid polarizers.

6. The apparatus of claim 5 wherein said electromagnetic waves includes wavelength values in the infrared range.

7. The apparatus of claim 6 wherein said first quarter-wave retarder, said first half-wave retarder, said second quarter-wave retarder, and said second half-wave retarder are surface-relief gratings.

8. The apparatus of claim 1 wherein said electromagnetic waves includes wavelength values in the infrared range.

9. The apparatus of claim 8 wherein said first linear polarizer and said second linear polarizer are wire grid polarizers.

10. The apparatus of claim 9 wherein said first quarter-wave retarder, said first half-wave retarder, said second quarter-wave retarder, and said second half-wave retarder are surface-relief gratings.

11. The apparatus of claim 1 wherein means for directing electromagnetic waves includes a lens.

12. A method for obtaining data concerning the surface characteristics of objects with a field of view comprising:

(a) directing electromagnetic waves from object points on said surface onto a plurality of assemblies whereby each said assembly includes a first quarter-wave retarder comprising a surface-relief grating and a first half-wave retarder comprising a surface-relief grating and a first linear polarizer and a first detecting means and a second quarter-wave retarder comprising a surface-relief grating and a second half-wave retarder comprising a surface-relief grating and a second linear polarizer and a second detecting means, said assemblies responding only to said waves originating from a respective object point;

(b) directing a first portion of said electromagnetic waves through said first quarter-wave retarder and said first half-wave retarder and said first linear polarizer and into said first detecting means, said first quarter-wave retarder and said first half-wave retarder and said first linear polarizer oriented to transmit only the right-hand circularly polarized component of said waves over a range of wavelength values of said electromagnetic waves;

(c) directing a second portion of said electromagnetic waves through said second quarter-wave retarder and said second half-wave retarder and said second linear polarizer and into said second detecting means, said second quarter-wave retarder and said second half-wave retarder and said second linear polarizer oriented to transmit only the left-hand circularly polarized component of said waves over a range of wavelength values of said electromagnetic waves;

(d) combining signals from said first detecting means and said second detecting means to yield output signals corresponding to data including at least one of first Stokes parameter I and fourth Stokes parameter V.

* * * * *